(12) United States Patent
Fukuda et al.

(10) Patent No.: US 8,897,616 B2
(45) Date of Patent: Nov. 25, 2014

(54) APPARATUS AND METHOD FOR UPCONVERTING CONTENT DATA

(75) Inventors: Tetsu Fukuda, Yokohama (JP); Shuntaro Aratani, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 1605 days.

(21) Appl. No.: 12/103,238

(22) Filed: Apr. 15, 2008

(65) Prior Publication Data
US 2008/0259205 A1 Oct. 23, 2008

(30) Foreign Application Priority Data
Apr. 17, 2007 (JP) ................................ 2007-108340

(51) Int. Cl.
| | |
|---|---|
| H04N 5/765 | (2006.01) |
| H04N 7/01 | (2006.01) |
| H04N 21/466 | (2011.01) |
| H04N 21/4402 | (2011.01) |
| H04N 21/462 | (2011.01) |
| H04N 21/482 | (2011.01) |
| H04N 21/442 | (2011.01) |
| H04N 21/485 | (2011.01) |
| H04N 21/475 | (2011.01) |
| H04N 21/4147 | (2011.01) |
| H04N 21/436 | (2011.01) |

(52) U.S. Cl.
CPC ....... *H04N 21/4621* (2013.01); *H04N 21/4668* (2013.01); *H04N 21/440272* (2013.01); *H04N 21/440263* (2013.01); *H04N 21/4826* (2013.01); *H04N 21/44222* (2013.01); *H04N 21/4667* (2013.01); *H04N 21/4854* (2013.01); *H04N 21/4755* (2013.01); *H04N 21/4852* (2013.01); *H04N 21/4147* (2013.01); *H04N 21/43622* (2013.01)

USPC ............................................ 386/232; 348/441

(58) Field of Classification Search
None
See application file for complete search history.

(56) References Cited

U.S. PATENT DOCUMENTS

| | | | | |
|---|---|---|---|---|
| 6,335,764 | B1 * | 1/2002 | Hashimoto et al. | ........... 348/565 |
| 6,999,129 | B2 | 2/2006 | Shirahama et al. | |
| 7,554,608 | B2 * | 6/2009 | Kawamura | ................... 348/584 |
| 2002/0071493 | A1 | 6/2002 | Shirahama et al. | |
| 2004/0031049 | A1 * | 2/2004 | Suzuki et al. | ................... 725/39 |
| 2004/0205817 | A1 * | 10/2004 | Soma et al. | ...................... 725/50 |

(Continued)

FOREIGN PATENT DOCUMENTS

| | | |
|---|---|---|
| CN | 1842142 A | 10/2006 |
| EP | 1156670 A2 | 11/2001 |

(Continued)

OTHER PUBLICATIONS

Instant HD [online]. kenstone.net. Jul. 2, 2006 [retrieved Dec. 15, 2011]. Retrieved from the internet: <URL:http://www.kenstone.net/fcp_homepage/review_instant_hd_douglas.html>.*

*Primary Examiner* — Jason K Lin
(74) *Attorney, Agent, or Firm* — Canon U.S.A., Inc. IP Division

(57) ABSTRACT

A signal processing apparatus includes an upconversion processing unit upconverting content data stored in a data storage unit, and an upconversion control unit determining an upconversion-target component and the upconversion processing order of components based on component attribute information such as a component type or a tag value of each component of the content data such as elementary streams.

17 Claims, 17 Drawing Sheets

(56) References Cited

U.S. PATENT DOCUMENTS

| | | |
|---|---|---|
| 2005/0005308 A1* | 1/2005 | Logan et al. .................. 725/135 |
| 2005/0285980 A1* | 12/2005 | Katayama ..................... 348/738 |
| 2006/0031889 A1* | 2/2006 | Bennett et al. ................. 725/80 |
| 2006/0221246 A1 | 10/2006 | Yoo |
| 2006/0294570 A1* | 12/2006 | Kelly et al. ................... 725/135 |
| 2007/0201822 A1 | 8/2007 | Kusunoki et al. |
| 2008/0019666 A1* | 1/2008 | Kato et al. ..................... 386/96 |

FOREIGN PATENT DOCUMENTS

| | | |
|---|---|---|
| EP | 1330121 A1 | 7/2003 |
| JP | 07-321662 A | 12/1995 |
| JP | 09-261071 A | 10/1997 |
| JP | 2001-326876 A1 | 11/2001 |
| JP | 2004-246526 A | 1/2004 |
| JP | 2007006461 A | 1/2007 |
| WO | 2006/082676 A1 | 8/2006 |

* cited by examiner

FIG.3

| PROGRAM IDENTIFYING INFORMATION ||| COMPONENT ATTRIBUTE INFORMATION ||| PROCESSING ORDER | UPCONVERTED/ NOT UPCONVERTED |
|---|---|---|---|---|---|---|---|
| service_id | event_id | start_time | event_name | TAG VALUE | COMPONENT TYPE | Gr.ID | | |
| 101 | 3251 | 8/20 19:00 | PROGRAM A | 0x00 | MAIN VIDEO DATA | 0x00 | 1 | 0x01 |
| | | | | 0x01 | SUB VIDEO DATA 1 | 0x01 | 3 | 0x00 |
| | | | | 0x02 | SUB VIDEO DATA 2 | 0x02 | — | 0x00 |
| | | | | 0x10 | MAIN AUDIO DATA | 0x00 | 2 | 0x01 |
| | | | | 0x11 | SUB AUDIO DATA 1 | 0x01 | 4 | 0x00 |
| | | | | 0x12 | SUB AUDIO DATA 2 | 0x02 | — | 0x00 |
| | | | | 0x40 | MAIN DATA | 0x00 | — | 0xFF |
| 103 | 64 | 8/21 21:00 | PROGRAM B | 0x00 | MAIN VIDEO DATA | 0x00 | 1 | 0x01 |
| | | | | 0x10 | MAIN AUDIO DATA | 0x00 | 2 | 0x00 |
| | | | | 0x11 | SUB AUDIO DATA | 0x01 | 3 | 0x00 |
| | | | | 0x40 | MAIN DATA | 0x00 | — | 0xFF |
| .. | .. | .. | .. | .. | .. | .. | .. | .. |

FIG.8

| PROGRAM IDENTIFYING INFORMATION | | | COMPONENT ATTRIBUTE INFORMATION | | | PROCESSING ORDER | UPCONVERTED/ NOT UPCONVERTED |
|---|---|---|---|---|---|---|---|
| service_id | event_id | start_time | event_name | TAG VALUE | COMPONENT TYPE | Gr.ID | | |
| 101 | 3251 | 8/20 19:00 | PROGRAM A | 0x00 | MAIN VIDEO DATA | 0x00 | 1 | 0x01 |
| | | | | 0x01 | SUB VIDEO DATA 1 | 0x01 | 2 | 0x00 |
| | | | | 0x02 | SUB VIDEO DATA 2 | 0x02 | 3 | 0x00 |
| | | | | 0x10 | MAIN AUDIO DATA | 0x00 | 1 | 0x01 |
| | | | | 0x11 | SUB AUDIO DATA 1 | 0x01 | 2 | 0x00 |
| | | | | 0x12 | SUB AUDIO DATA 2 | 0x02 | 3 | 0x00 |
| | | | | 0x40 | MAIN DATA | 0x00 | — | 0xFF |
| 103 | 64 | 8/21 21:00 | PROGRAM B | 0x00 | MAIN VIDEO DATA | 0x00 | 1 | 0x01 |
| | | | | 0x10 | MAIN AUDIO DATA | 0x00 | 1 | 0x01 |
| | | | | 0x11 | SUB AUDIO DATA | 0x01 | 2 | 0x00 |
| | | | | 0x40 | MAIN DATA | 0x00 | — | 0xFF |
| .. | .. | .. | .. | .. | .. | .. | .. | .. |

FIG.11

| PROGRAM IDENTIFYING INFORMATION | | | USER SETTING | COMPONENT ATTRIBUTE INFORMATION | | | PROCESSING ORDER | UPCONVERTED/ NOT UPCONVERTED |
|---|---|---|---|---|---|---|---|---|
| service_id | event_id | start_time | event_name | | TAG VALUE | COMPONENT TYPE | Gr.ID | | |
| 101 | 3251 | 8/20 19:00 | PROGRAM A | 0x01 | 0x00 | MAIN VIDEO DATA | 0x00 | 2 | 0x01 |
| | | | | | 0x01 | SUB VIDEO DATA 1 | 0x01 | 3 | 0x00 |
| | | | | | 0x02 | SUB VIDEO DATA 2 | 0x02 | — | 0x00 |
| | | | | | 0x10 | MAIN AUDIO DATA | 0x00 | 1 | 0x01 |
| | | | | | 0x11 | SUB AUDIO DATA 1 | 0x01 | 4 | 0x00 |
| | | | | | 0x12 | SUB AUDIO DATA 2 | 0x02 | — | 0x00 |
| | | | | | 0x40 | MAIN DATA | 0x00 | — | 0xFF |
| 103 | 64 | 8/21 21:00 | PROGRAM B | 0x00 | 0x00 | MAIN VIDEO DATA | 0x00 | 1 | 0x01 |
| | | | | | 0x10 | MAIN AUDIO DATA | 0x00 | 2 | 0x00 |
| | | | | | 0x11 | SUB AUDIO DATA | 0x01 | 3 | 0x00 |
| | | | | | 0x40 | MAIN DATA | 0x00 | — | 0xFF |
| .. | .. | .. | .. | .. | .. | .. | .. | .. | .. |

FIG.12

(CONTENT VIDEO IMAGE)

YOU CAN SET UPCONVERSION
PROCESSING ORDER OF
PROGRAM XX. SET ORDER?

YES  NO

FIG.13

| PROGRAM IDENTIFYING INFORMATION ||||| COMPONENT ATTRIBUTE INFORMATION ||| PROCESSING ORDER | UPCONVERTED/ NOT UPCONVERTED |
|---|---|---|---|---|---|---|---|---|---|
| service_id | event_id | start_time | event_name | genre | TAG VALUE | COMPONENT TYPE | Gr.ID | | |
| 101 | 3251 | 8/20 19:00 | PROGRAM C | 0x0601 | 0x00 | MAIN VIDEO DATA | 0x00 | 1 | 0x01 |
| | | | | | 0x01 | SUB VIDEO DATA 1 | 0x01 | 3 | 0x00 |
| | | | | | 0x02 | SUB VIDEO DATA 2 | 0x02 | 4 | 0x00 |
| | | | | | 0x10 | MAIN AUDIO DATA | 0x00 | 2 | 0x01 |
| | | | | | 0x11 | SUB AUDIO DATA 1 | 0x01 | 5 | 0x00 |
| | | | | | 0x12 | SUB AUDIO DATA 2 | 0x02 | 6 | 0x00 |
| | | | | | 0x40 | MAIN DATA | 0x00 | — | 0xFF |
| 103 | 64 | 8/21 21:00 | PROGRAM D | 0x0000 | 0x00 | MAIN VIDEO DATA | 0x00 | 1 | 0x01 |
| | | | | | 0x10 | MAIN AUDIO DATA | 0x00 | 2 | 0x00 |
| | | | | | 0x11 | SUB AUDIO DATA | 0x01 | 3 | 0x00 |
| | | | | | 0x40 | MAIN DATA | 0x00 | — | 0xFF |
| .. | .. | .. | .. | .. | .. | .. | .. | .. | .. |

FIG.14

| GENRE | | PROCESSING ORDER | | | | | |
|---|---|---|---|---|---|---|---|
| | | 1 | 2 | 3 | 4 | 5 | 6 OR LATER |
| CINEMA (FOREIGN FILM) | (0x0600) | MAIN VIDEO DATA | MAIN AUDIO DATA (ENG) | SUB VIDEO DATA 1 | SUB VIDEO DATA 2 | SUB AUDIO DATA (JP) | TAG VALUE ORDER |
| CINEMA (JAPANESE FILM) | (0x0601) | MAIN VIDEO DATA | MAIN AUDIO DATA (JP) | SUB VIDEO DATA 1 | SUB VIDEO DATA 2 | SUB AUDIO DATA (ENG) | |
| SPORTS | (0x0100) | MAIN VIDEO DATA | SUB VIDEO DATA 1 | SUB VIDEO DATA 2 | MAIN AUDIO DATA | SUB AUDIO DATA | |
| MUSIC | (0x0400) | MAIN AUDIO DATA | MAIN VIDEO DATA | SUB VIDEO DATA 1 | SUB VIDEO DATA 2 | SUB AUDIO DATA | |
| NEWS | (0x0000) | MAIN VIDEO DATA | MAIN AUDIO DATA | SUB AUDIO DATA | — | — | |
| VAUDEVILLE | (0x0500) | MAIN VIDEO DATA | SUB VIDEO DATA 1 | SUB VIDEO DATA 2 | MAIN AUDIO DATA | SUB AUDIO DATA | |
| CARTOON | (0x0700) | MAIN VIDEO DATA | SUB VIDEO DATA 1 | MAIN AUDIO DATA | SUB VIDEO DATA 2 | SUB AUDIO DATA | |
| OTHERS | (0x0F00) | MAIN VIDEO DATA | MAIN AUDIO DATA | SUB VIDEO DATA 1 | SUB VIDEO DATA 2 | SUB AUDIO DATA | |

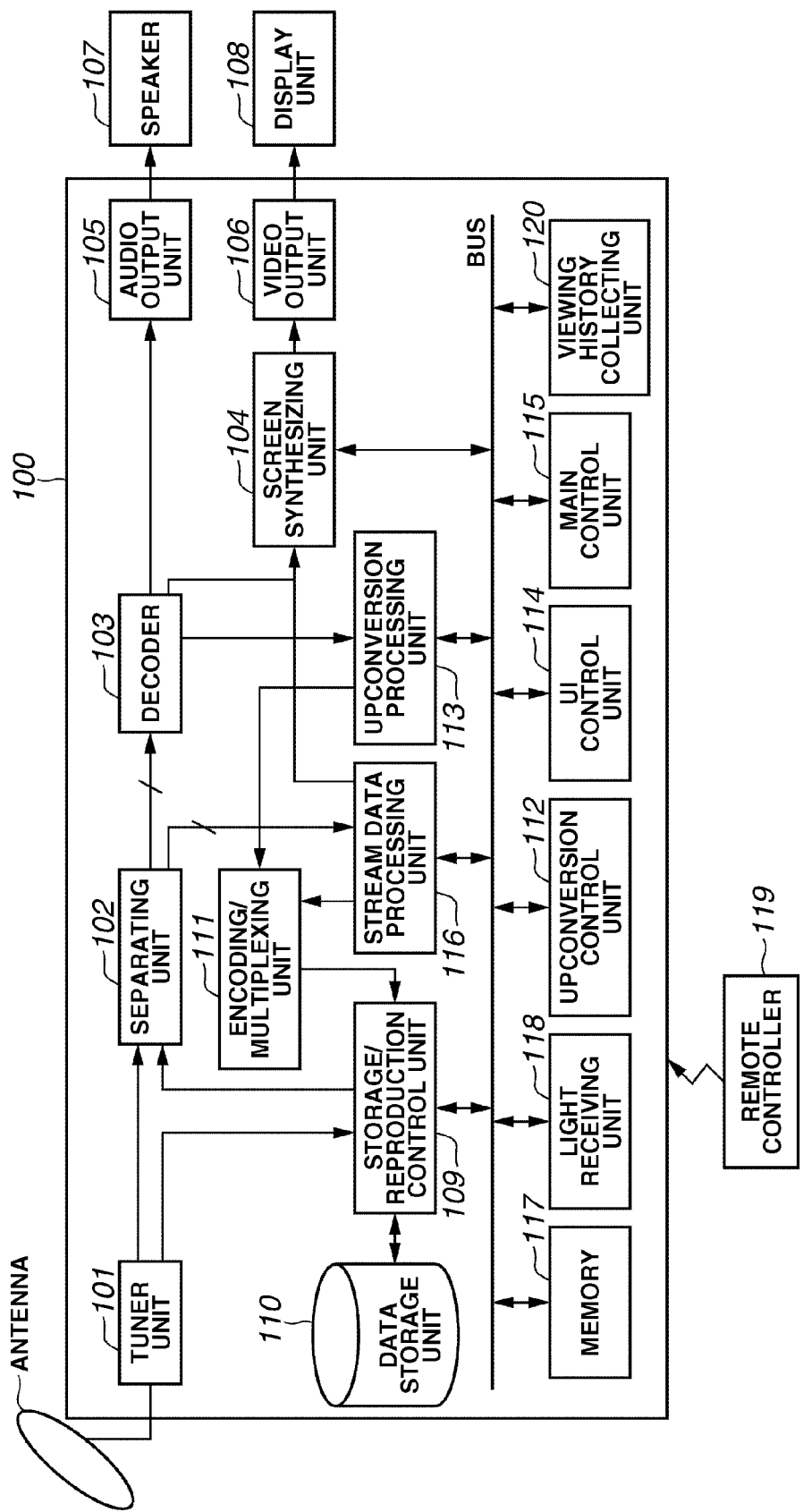

FIG.16

| service_id | event_id | start_time | event_name | genre | series_id | VIEWING COMPONENT | | VIEWING TIME |
|---|---|---|---|---|---|---|---|---|
| | | | | | | VIDEO COMPONENT TYPE /TAG VALUE /TAG VALUE | AUDIO COMPONENT TYPE /TAG VALUE /TAG VALUE | |
| 101 | 3251 | 8/20 19:00 | "NICHIYO YOGA GEKIJYO" | 0x0600 | 0x0FE5 | MAIN VIDEO DATA/0x00 | MAIN AUDIO DATA (JP)/0x10 | 00:16:45 |
| | | | | | | MAIN VIDEO DATA/0x00 | SUB AUDIO DATA (ENG)/0x11 | 01:33:15 |
| 103 | 64 | 8/20 21:00 | F1 | 0x0100 | 0x0106 | MAIN VIDEO DATA/0x00 | MAIN AUDIO DATA/0x10 | 00:56:15 |
| | | | | | | SUB VIDEO DATA 1/0x01 | SUB AUDIO DATA 1/0x11 | 02:30:48 |
| | | | | | | SUB VIDEO DATA 2/0x02 | SUB AUDIO DATA 2/0x12 | 00:16:21 |
| 101 | 2564 | 8/27 19:00 | "NICHIYO YOGA GEKIJYO" | 0x0600 | 0x0FE5 | MAIN VIDEO DATA/0x00 | MAIN AUDIO DATA (JP)/0x10 | 00:04:21 |
| | | | | | | MAIN VIDEO DATA/0x00 | SUB AUDIO DATA (ENG)/0x11 | 01:45:39 |
| 191 | 55 | 8/31 22:00 | "EIGA WTC" | 0x0600 | 0x0021 | MAIN VIDEO DATA/0x00 | MAIN AUDIO DATA (ENG)/0x10 | 2:29:44 |
| | | | | | | MAIN VIDEO DATA/0x00 | SUB AUDIO DATA (JP)/0x11 | 0:00:00 |
| ... | ... | ... | ... | ... | ... | ... | ... | ... |

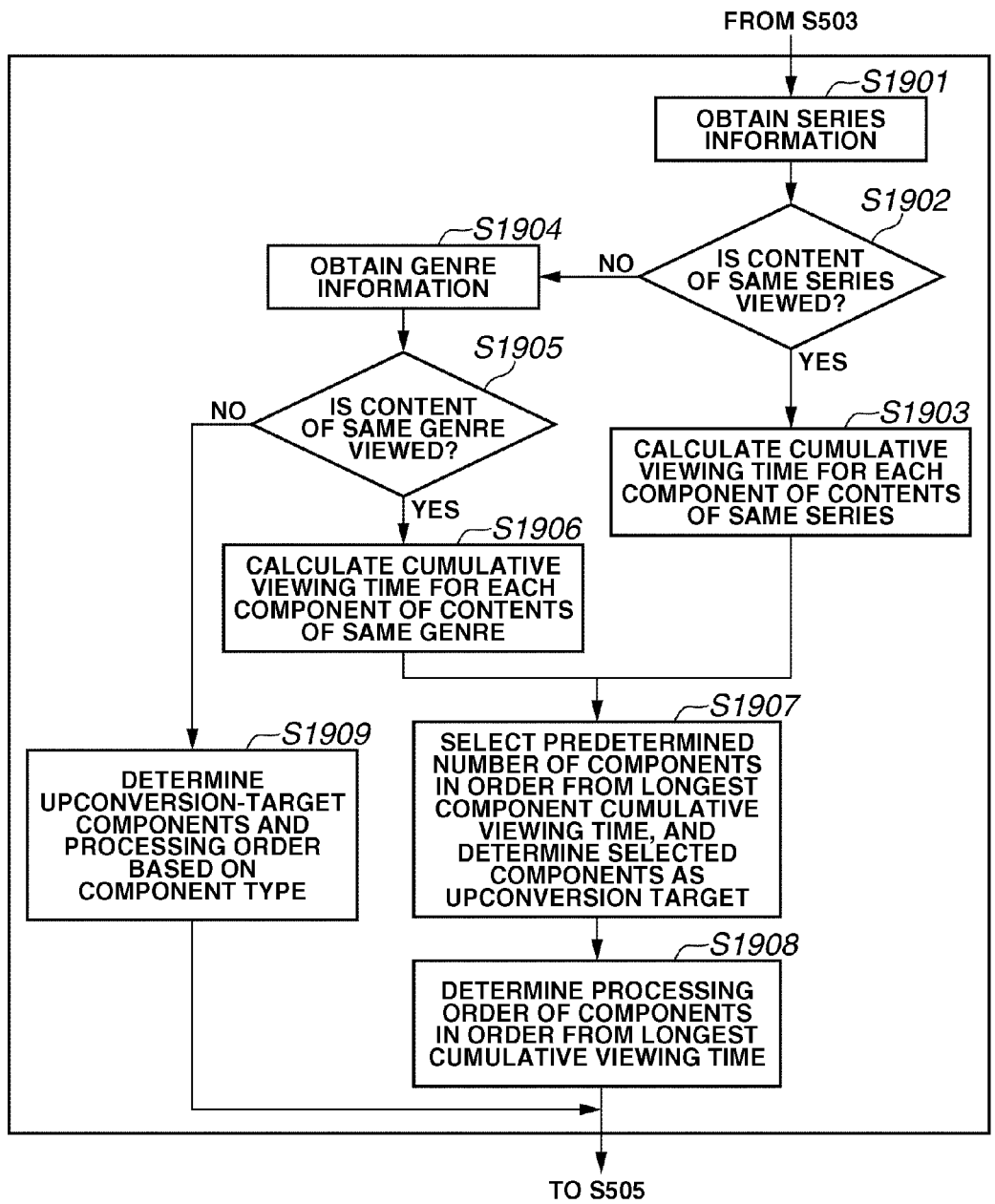

APPARATUS AND METHOD FOR UPCONVERTING CONTENT DATA

BACKGROUND OF THE INVENTION

1. Field of the Invention

The present invention relates to apparatus and methods for upconverting content data including plural components.

2. Description of the Related Art

Hitherto, various techniques have been researched regarding upconversion processing for realizing more realistic and powerful images and sounds, such as a technique for enhancing video image quality and sound quality.

Along with an increase in display screen size and resolution, a demand for products equipped with the image quality enhancing technique would grow in the future. For example, a technique for converting a standard-definition (SD) video image to a high-definition (HD) video image (resolution conversion) through classification/adaptive processing has been under study. Further, various techniques have been proposed for enhancing the image quality, such as a technique for generating a high-quality video image through γ correction (gamma correction) or contour correction.

Japanese Patent Application Laid-Open No. 07-321662 discusses a technique that combines time-part processing and frequency-part processing to increase processing accuracy. Japanese Patent Application Laid-Open No. 2004-246526 discusses a technique for achieving a high-accuracy processing result which more precisely corresponds to real events, in consideration of the real events where data is obtained.

Further, a demand for products equipped with the sound quality enhancing technique has been increased. Japanese Patent Application Laid-Open No. 09-261071 discusses a technique for converting a format of multi-bit audio data having a sampling frequency fS and extracted from a compact disc (CD) into 1-bit audio data having a sampling frequency m*fS (m is an integer). This technique enables reproduction of even a subtle sound or nuance that could not be realized by the CD.

There are two methods for upconversion processing, that is, a method for processing content data concurrently with reproduction of the data and a method of processing content data over time, not concurrently with the reproduction.

For example, in the case of raising video image quality through dynamic gamma correction, content data can be processed almost concurrently with reproduction. On the other hand, in the case of raising video image quality through resolution conversion or raising sound quality through format conversion, in some cases, content data could not be processed concurrently with reproduction because of its high processing load.

For example, in the case of converting a format of multi-bit audio data extracted from a CD into 1-bit audio data as described above, if a system throughput is not so high, processing takes several times as long as the reproduction time of music. In this case, content data may be temporarily stored in a recording medium and then gradually upconverted. In the case of gradually upconverting data in this way, if a processing time is long, the following problem occurs. That is, when a user desires to reproduce content data being processed, the content data cannot be reproduced.

According to the moving pictures experts group 2 (MPEG-2) standard, a standard adopted for digital broadcasting standards and a package media such as digital versatile disc (DVD), plural elementary streams (ESs) are multiplexed. To be specific, plural components, for example, video images, sounds, and additional information are multiplexed.

According to this standard, plural video components are multiplexed to enable a user to view multi-angle video images (video images taken with plural cameras at different angles) at the same time or by freely switching the angles. Further, it is possible to support various languages by multiplexing plural audio components.

At the time of upconverting content data obtained by multiplexing plural components (elementary streams), if all components are upconverted in parallel, a high processing load is imposed on the system. However, it is supposedly unnecessary to upconvert all components at the same time in many cases.

For example, if a user wants to view only a main video image of multi-angle video images, it is preferred to enhance a quality of the main video image ahead of (prior to) sub video images. If a user wants to view a music program with a high sound quality, it is preferred to enhance a sound quality ahead of (prior to) an image quality.

SUMMARY OF THE INVENTION

Embodiments of the present invention can provide a signal processing apparatus and a signal processing method which can efficiently upconvert content data composed of plural components.

According to an aspect of the present invention, a method of upconverting content data including two or more components capable of reproduction by reproduction apparatus. The method includes generating upconversion control information for said content data, and upconverting one or more components of the content data in accordance with the generated upconversion control information.

According to exemplary embodiments of the present invention, at the time of upconverting content data including plural components, the plural components can be upconverted in efficient order. This enhances convenience for users.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 illustrates an example of content information stored in a memory of FIG. 1.

FIG. 8 illustrates an example of content information according to a modified example of the first exemplary embodiment.

FIG. 11 illustrates an example of updated content information.

FIG. 12 illustrates an example of an automatically displayed guide screen according to a second exemplary embodiment of the present invention.

FIG. 13 illustrates an example of content information according to a third exemplary embodiment of the present invention.

FIG. 14 illustrates an example of genre list information of the third exemplary embodiment.

FIG. 15 is a block diagram illustrating a configuration of a signal processing apparatus according to a fourth exemplary embodiment of the present invention.

FIG. 16 illustrates an example of viewing history information collected by a viewing history collecting unit of FIG. 15.

FIG. 17 is a flowchart illustrating a processing procedure of the fourth exemplary embodiment.

DETAILED DESCRIPTION OF THE EMBODIMENTS

Various exemplary embodiments, features, and aspects of the invention will be described in detail below with reference to the drawings.

First Exemplary Embodiment

Figure 1:
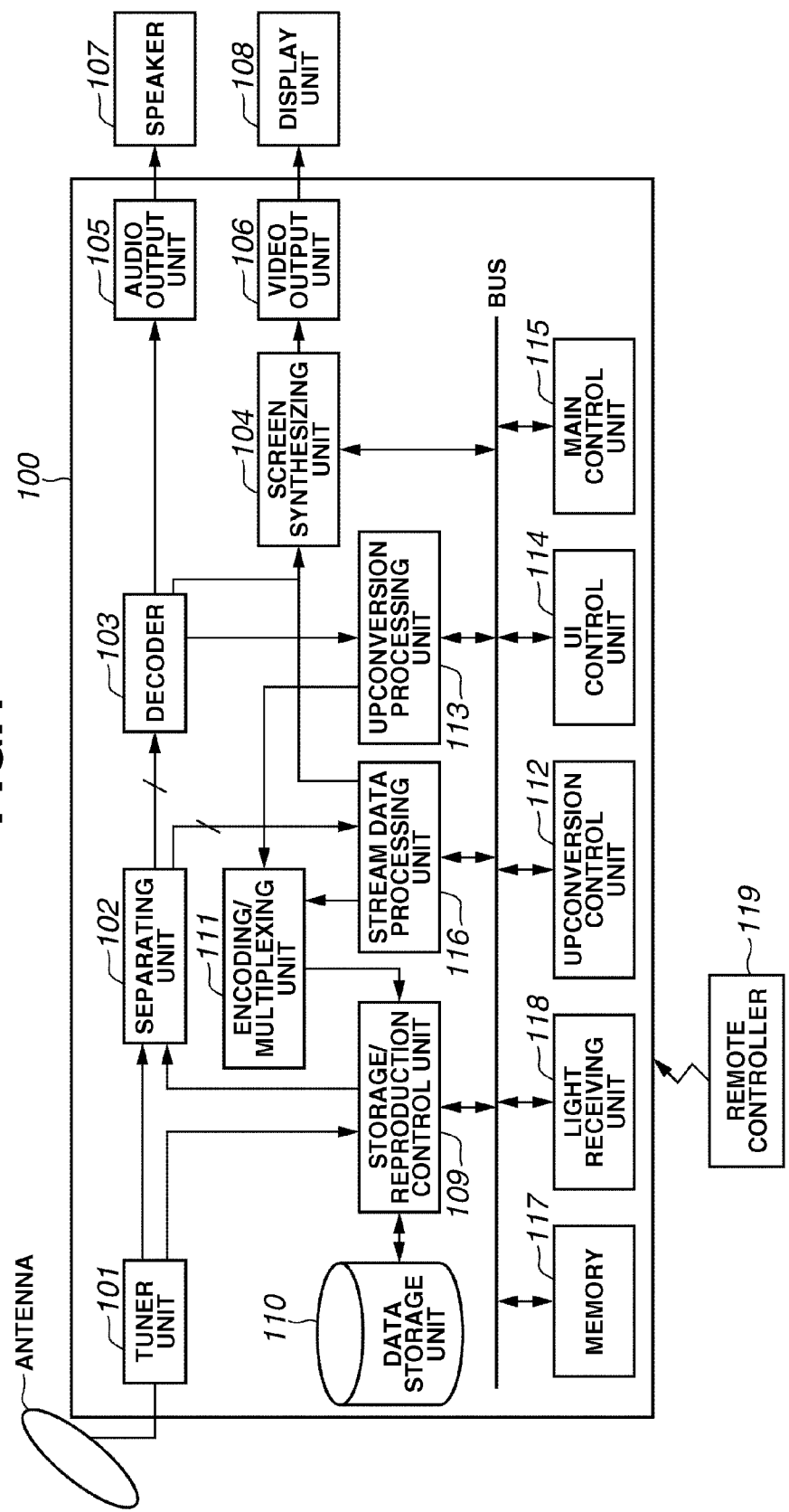
FIG. 1 is a block diagram illustrating a configuration of a signal processing apparatus according to a first exemplary embodiment of the present invention.

FIG. 1 is a block diagram illustrating a configuration of a signal processing apparatus 100 according to a first exemplary embodiment of the present invention. In FIG. 1, a broadcasting signal received by an antenna (or a cable) is input to a tuner unit 101. The tuner unit 101 performs demodulation, error correction, or other processing on the broadcasting signal received from the antenna to generate and output data (TS data) in a transport stream (TS) format.

A separating unit 102 extracts data of a channel selected from TS data corresponding to plural channels output from the tuner unit 101. Then, the separating unit 102 outputs video data and audio data to a decoder 103, and outputs electronic program guide (EPG) data and broadcast data to a stream data processing unit 116.

The decoder 103 decodes the audio data from the separating unit 102 and outputs the decoded data to an audio output unit 105. The audio output unit 105 performs amplification and digital-analog conversion of the audio data which is decoded by the decoder 103, and then outputs the resultant data to a speaker 107. In addition, the decoder 103 decodes the video data from the separating unit 102 and outputs the data to a screen synthesizing unit 104.

The stream data processing unit 116 stores EPG data and broadcast data output from the separating unit 102 in a memory 117 via a bus. The screen synthesizing unit 104 reads the EPG data or broadcast data stored in the memory 117 in response to a user's instruction input from a remote controller 119 to compose an EPG screen or a data broadcasting screen. Then, the screen synthesizing unit 104 combines the data with video data from the decoder 103 and outputs the resultant data to a video output unit 106. The video output unit 106 displays a screen composed by the screen synthesizing unit 104 on a display unit 108.

A storage/reproduction control unit 109 stores TS data from the tuner unit 101 in a data storage unit 110 or reads TS data from the data storage unit 110 to reproduce the data in response to a user's instruction input from the remote controller 119. Further, the storage/reproduction control unit 109 reproduces TS data stored in the data storage unit 110 in the upconversion processing. The storage/reproduction control unit 109 outputs the TS data read from the data storage unit 110 to the separating unit 102 in the reproduction.

An upconversion processing unit 113 (processing means) performs upconversion processing on the video data and audio data output from the decoder 103 and outputs the resultant data to an encoding/multiplexing unit 111.

Figure 2:
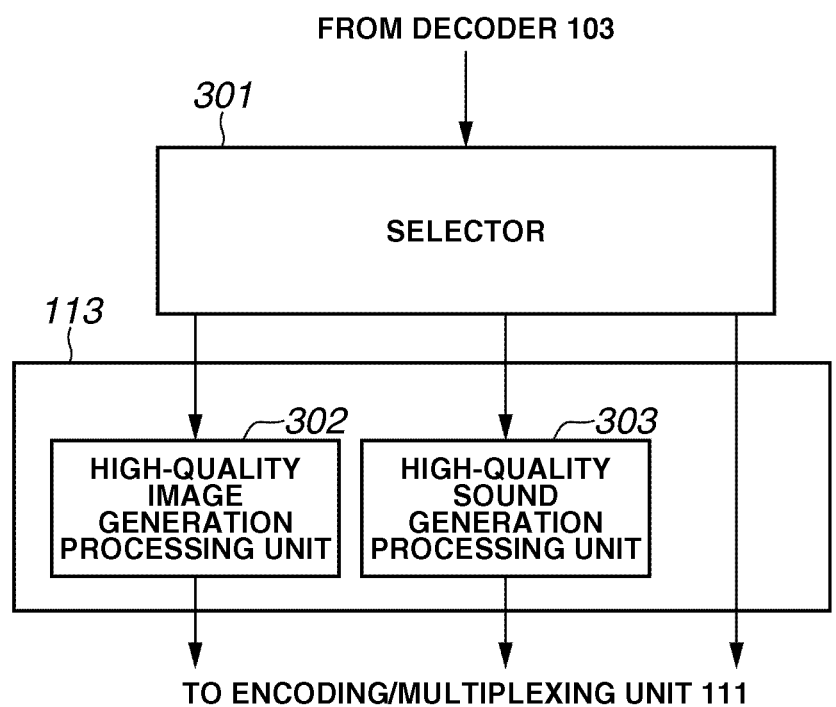
FIG. 2 is a block diagram illustrating an internal configuration of an upconversion processing unit of FIG. 1.

FIG. 2 is a block diagram illustrating an internal configuration of the upconversion processing unit 113 of FIG. 1. The data output from the decoder 103 is input to the upconversion processing unit 113 via a selector 301. To be specific, video components (video elementary streams) output from the decoder 103 are input to a high-quality image generation unit 302 to enhance the image quality, and audio components (audio elementary streams) output from the decoder 103 are input to a high-quality sound generation unit 303 to enhance the sound quality.

If the data output from the decoder 103 includes components other than upconversion-target components, the data is input to the encoding/multiplexing unit 111 without being upconverted. An upconversion control unit 112 (upconversion control means) controls operations of the selector 301 according to component attribute information ("component type" or "tag value").

The quality enhanced video data from the high-quality image generation unit 302 and the quality enhanced audio data from the high-quality sound generation unit 303 are input to the encoding/multiplexing unit 111.

In FIG. 1, the encoding/multiplexing unit 111 encodes the upconverted video data and audio data, and multiplexes the resultant data together with broadcast data output from the stream data processing unit 116. The TS data multiplexed by the encoding/multiplexing unit 111 is stored in the data storage unit 110 through the storage/reproduction control unit 109.

The upconversion control unit 112 controls an upconverting operation of the upconversion processing unit 113. To be specific, the upconversion control unit 112 stores content information regarding content data (TS data) stored in the data storage unit 110 in the memory 117, and then, performs registration, update, and deletion of the content information on a content basis.

The content information is registered when the storage/reproduction control unit 109 stores the contents in the data storage unit 110 or programs the data storage unit 110 to store the contents. The content information can be stored in the data storage unit 110 together with the content data. The control operation of the upconversion control unit 112 is described in detail below.

Here, the upconversion processing in the present invention refers to quality enhancement processing (enhancing image quality and sound quality) that would be practically difficult to execute in real time, that is, the quality enhancement processing that requires time longer than an actual time length of content. For example, the upconversion processing assumes the quality enhancement processing that imposes a high processing load such as processing for reproducing details with reference to plural video frames and converting video data into a high-definition video image.

In such cases, a complicated algorithm is used, so that it is difficult to perform upconversion processing in real time. Also, in the case of executing complicated sound-quality enhancement processing such as reproducing sounds faithfully to the original sounds and reproducing realistic sounds, it is difficult to perform the upconversion processing in real time.

To that end, in the exemplary embodiments of the present invention, content data (TS data) stored in the data storage unit 110 is gradually upconverted. That is, the content data (TS data) read from the data storage unit 110 by the storage/reproduction control unit 109 is supplied to the upconversion processing unit 113 via the separating unit 102 and the decoder 103 and then upconverted.

A user interface (UI) control unit 114 acquires various types of GUI data (image data, text data, etc.) from the memory 117 according to a user's instruction input from the remote controller 119 or a system operation status. Then, the UI control unit 114 controls the screen synthesizing unit 104 to compose various GUI screens.

A main control unit 115 executes control over blocks in the signal processing apparatus 100. A light receiving unit 118 receives remote control signals input from the remote controller 119 and transfers the signals to each control unit.

FIG. 3 illustrates an example of content information stored in the memory 117 of FIG. 1. In FIG. 3, a content information table includes program identifying information, component attribute information, information about the upconversion processing order, and information whether upconversion processing is completed.

The program identifying information is used to identify content data (program) stored in the data storage unit 110. This information is composed of "service_id", "event_id", "start_time" and "event_name" included in EPG data. The "service_id" is an identification number for identifying a broadcasting station (or channel number). The "event_id" is an identification number for identifying a program. The "start_time" represents starting date and time of a target program, and the "event_name" represents a program name.

A "tag value" is described in a program map table (PMT) and assigned to each component of the content data. The Association of Radio Industries and Businesses (ARIB) standard STD-B10 specifies the "tag value" for component as "component_tag". For example, the ARIB STD-B10 assigns a "tag value" in the range from 0*00 to 0*0F to video components, a "tag value" in the range from 0*10 to 0*2F to audio components, and a "tag value" in the range from 0*30 to 0*7F to other components.

The "component type" is described in an event information table (EIT) and represents attribute of each component of the content data (main video data, sub video data 1, sub video data 2, main audio data, sub audio data 1, sub audio data 2, etc.). The "component type" is defined by a descriptor of "text_char" in the EIT. Further, "Gr.ID" is defined in a multiview TV service that allows a user to view plural multi-angle video images at the same time or to switchably view the images. The "Gr.ID" is defined by "component_group_id" of a component group descriptor in the EIT.

The upconversion control unit 112 determines the upconversion processing order according to the component attribute information ("component type" or "tag value") of components in the content data. For example, the upconversion processing order of components of the program A is determined as: "main video data (default)", "main audio data (default)", "sub video data 1", and "sub audio data 1".

In this case, the processing order is determined so that video data precedes audio data and a main component precedes any sub component. Further, the "sub video data 2" and "sub audio data 2" are not subjected to upconversion processing because of low priorities, and their processing order is not determined. However, the above processing order is an example and the present invention is not limited thereto. A procedure for determining the upconversion processing order is described below.

The information in the upconverted/not upconverted column is a flag representing whether upconversion processing for each component is completed. If the upconversion processing is completed, "0*01" is set. On the other hand, if the upconversion processing has not been completed, "0*00" is set. In the present exemplary embodiment, upconversion processing is intended for video data and audio data only and the other data (EPG data or broadcast data) is not subjected to upconversion processing, so that "0*FF" is set.

Figure 4:
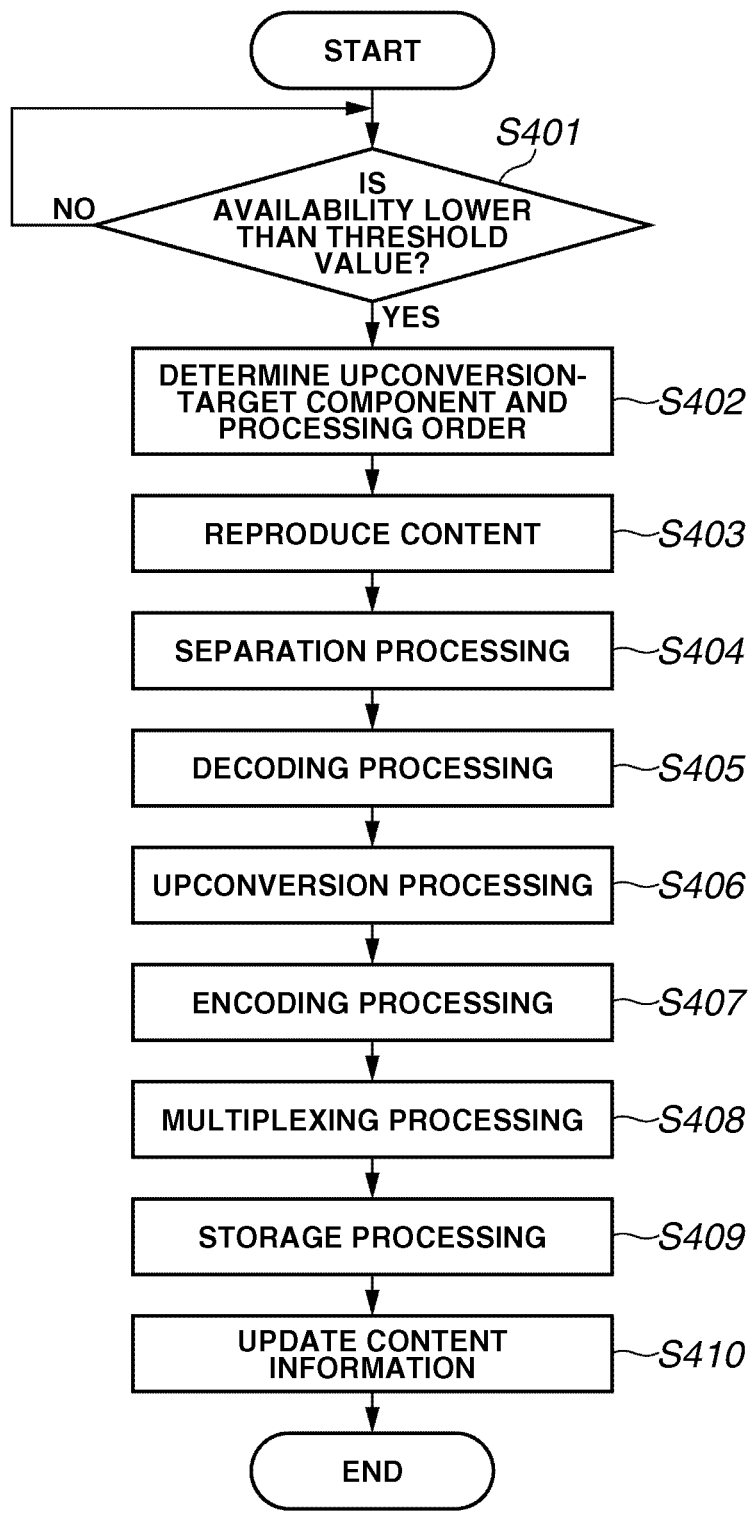
FIG. 4 is a flowchart illustrating an upconversion processing procedure of the first exemplary embodiment.

FIG. 4 is a flowchart illustrating the upconversion processing procedure of the first exemplary embodiment. In step S401, the upconversion control unit 112 starts control for the upconversion processing when a system operation availability falls below a predetermined threshold value. In the present exemplary embodiment, if an operation load of the resources (a central processing unit (CPU)) is low, the content data stored in the data storage unit 110 will be upconverted. However, the upconversion control unit 112 can start control for the upconversion processing in response to a user's instruction to start the upconversion processing.

In step S402, the upconversion control unit 112 reads content information of the content data as an upconversion target from the memory 117, and determines the upconversion-target component and the upconversion processing order. The operation in step S402 is described in detail later with reference to FIG. 5.

Next, in step S403, the storage/reproduction control unit 109 reproduces the content data stored in the data storage unit 110. In step S404, the separating unit 102 separates the reproduced content data into the video data, the audio data, and the other data. In step S405, the decoder 103 decodes the video data and audio data output from the separating unit 102.

Next, in step S406, the upconversion processing unit 113 upconverts the upconversion-target components of the video data and audio data output from the decoder 103.

In step S407, the encoding/multiplexing unit 111 encodes each component output from the upconversion processing unit 113. Next, in step S408, the encoding/multiplexing unit 111 multiplexes the encoded component together with components from the stream data processing unit 116 (EPG data or broadcasting data etc.) to generate TS data.

In step S409, the storage/reproduction control unit 109 stores the multiplexed content data (TS data) in the data storage unit 110. In step S410, the upconversion control unit 112 updates the content information in the memory 117 so that "upconverted" is set for upconverted components. In this way, the above-mentioned upconversion processing is executed on all content data until the whole content data is "upconverted". Then, a series of processes is completed.

Figure 5:
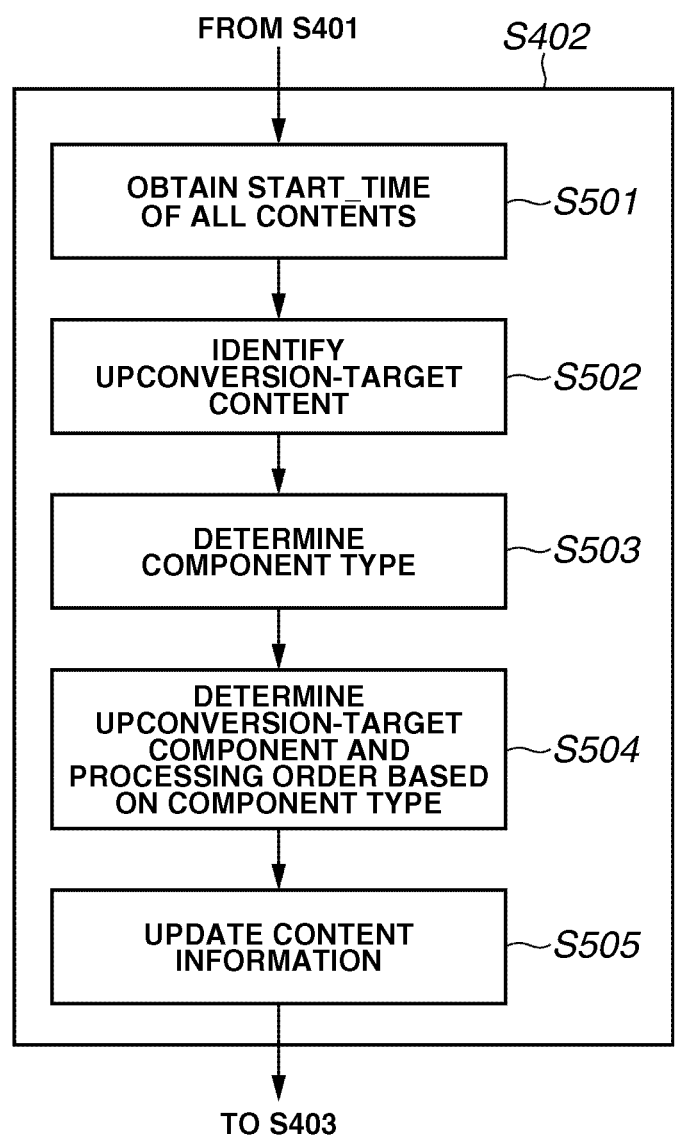
FIG. 5 is a flowchart illustrating a procedure for determining an upconversion target component and processing order.

FIG. 5 is a detailed flowchart illustrating the processing for determining an upconversion-target component and the upconversion processing order in step S402 of FIG. 4. In step S501, the upconversion control unit 112 reads content information stored in the memory 117 and acquires "start_time" of each content.

Then, in step S502, the upconversion control unit 112 specifies content data having the earliest "start_time" as upconversion-target content data. However, if the specified content data has been already upconverted or includes no upconversion-target component, the content data having the next earliest "start_time" is specified as an upconversion target.

Next, in step S503, the upconversion control unit 112 acquires an EIT in the content information of the specified content data and analyzes the component attribute information ("component type" or "tag value") of each component in the content data. Then, in step S504, the upconversion control unit 112 determines the upconversion-target component and the processing order for each component based on the component attribute information.

In the present exemplary embodiment, as illustrated in FIG. 3, the upconversion processing order is set to the order of "main video data", "main audio data", "sub video data 1", and "sub audio data 1" (in order of increasing "tag value"). As for content data compliant with a multiview TV service, the processing order is set to the order of increasing a value of "Gr.ID" and the order of increasing a component tag value in the same "Gr.ID".

Here, "main video data", "main audio data", "sub video data 1", and "sub audio data 1" are set as an upconversion target, and "sub video data 2", "sub audio data 2", and "other data" are not set as an upconversion target, but the present invention is not limited thereto. For example, all video components and audio components can be set as an upconversion target, or only components corresponding to "main video data" and "main audio data" can be set as an upconversion target.

Next, in step S505, the upconversion control unit 112 updates the component information to register the determined processing order.

Figure 6:
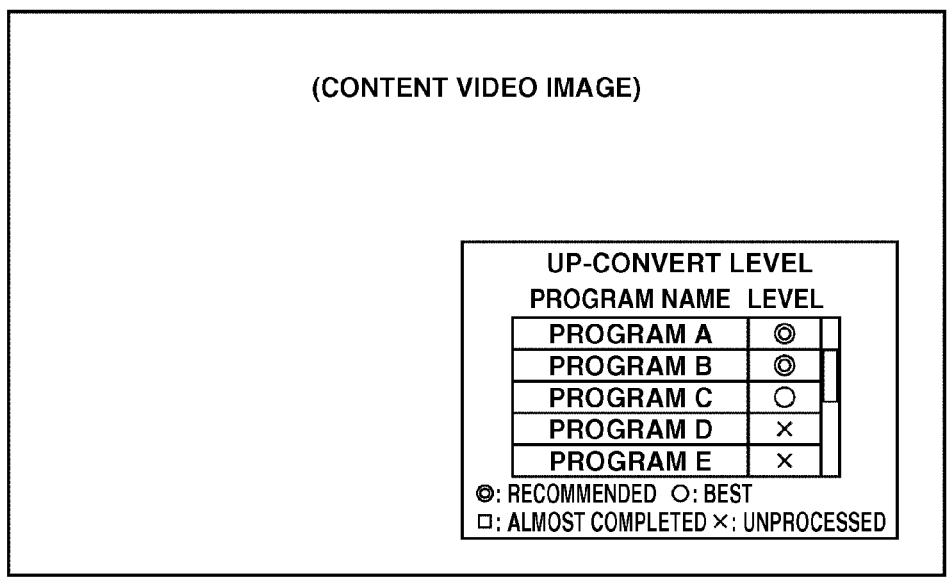
FIG. 6 illustrates an example screen for checking the progress of upconversion processing.

FIG. 6 illustrates an example screen for checking the progress of the upconversion processing. If a user issues an instruction to display a screen for checking the progress of the upconversion processing with the remote controller 119, a screen is composed by the UI control unit 114 and the screen synthesizing unit 104 as illustrated in FIG. 6.

The remote controller 119 can include a dedicated button for "display upconversion level", or "display upconversion level" may be added to menu items. In FIG. 6, the upconversion level indicates the progress of the upconversion processing on content data (program).

In the present exemplary embodiment, the following four states can be displayed. That is, if all upconversion-target components are already upconverted, "◎: recommended!" is displayed. If only components corresponding to "main video data" and "main audio data" are upconverted, "○: best" is displayed. Further, if only components of "main video data" are upconverted, "□: almost completed" is displayed. If the upconversion processing is not yet executed, "x: unprocessed" is displayed.

A user can select and reproduce desired content data on the screen. In the case of reproducing and viewing a program ranked as "○: best", the control unit can execute the upconversion processing on target components for which upconversion is not yet complete when the user is viewing the program. In this case, it is conceivable that upconversion processing is completed on all components and the upconversion level is changed to "◎: recommended!" while the user is viewing the program.

In the present exemplary embodiment, the content data (program) are sequentially upconverted one by one, but plural programs can be upconverted at a time. If plural programs are upconverted in parallel, the plural programs can be all ranked as "○: best" or "□: almost completed".

Figure 7:
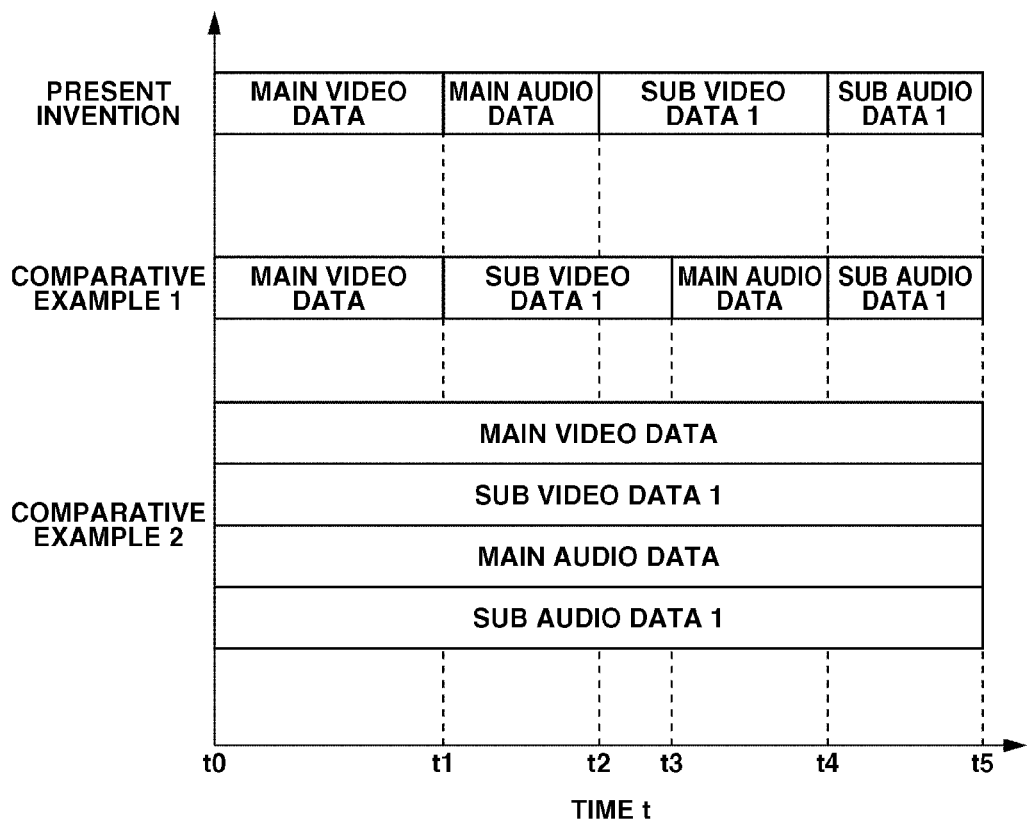
FIG. 7 illustrates a time period necessary for upconversion processing.

FIG. 7 illustrates a time period necessary for the upconversion processing. Referring to FIG. 7, a case of starting upconversion processing for four components, "main video data", "main audio data", "sub video data 1", and "sub audio data 1" from time t0 is described.

As illustrated in FIG. 3, according to the first exemplary embodiment, the components are upconverted in the order of "main video data", "main audio data", "sub video data 1", and "sub audio data 1". In this case, during a period from time t0 to time t1, the upconversion level is "x: unprocessed". At time t1, the upconversion processing for "main video data" is completed, and the upconversion level is shifted to "□: almost completed".

Then, at time t2, the upconversion processing for "main audio data" is completed, and the upconversion level is shifted to "○: best". At time t4, the upconversion processing for "sub video data 1" is completed, and at time t5, the upconversion processing for "sub audio data 1" is completed. Then, the upconversion level is shifted to "◎: recommended!".

In contrast, according to a comparative example 1 which is a first variant in accordance with the invention, the components are upconverted in the order of "main video data", "sub video data 1", "main audio data", and "sub audio data 1". At time t1, "main video data" is completed, and the upconversion level is shifted to "□: almost completed". After that, at time t3, the upconversion processing for "sub video data 1" is completed, but the upconversion level is not changed.

At time t4, the upconversion processing for "main audio data" is completed, and the upconversion level is shifted to "○: best". Then, at time t5, the upconversion processing for "sub audio data 1" is completed, and the upconversion level is shifted to "◎: recommended!".

Further, according to a comparative example 2 which is a second variant in accordance with the present invention, the components, "main video data", "sub video data 1", "main audio data", and "sub audio data 1" are upconverted in parallel. In this case, during a period from time t0 to time t5, the upconversion level is kept at "x: unprocessed". Then, at time t5, the upconversion processing for all of "main video data", "sub video data 1", "main audio data", and "sub audio data 1" is completed, and the upconversion level is shifted to "◎: recommended!".

These examples are described on the assumption that the ending times are not different between the case of upconverting the four components one by one and the case of upconverting the four components in parallel, but the ending time may vary in some degree.

As described above, the first exemplary embodiment of the present invention is the quickest for the upconversion level to reach "○: best" (at time t2) compared to the comparative examples 1 and 2. If the upconversion of "main video data" and "main audio data" is completed, a user can view contents in sets with "main video data" and "main audio data" although not enjoying the multiview TV service.

Most of users might generally view contents in sets with "main video data" and "main audio data", so it is effective to determine the upconversion processing order of components as in the first exemplary embodiment of the present invention. In this way, preferentially upconverting the components having high probability of being viewed by a user allows the user to enjoy viewing contents upconverted at the earlier time.

In the present exemplary embodiment, the upconversion processing is intended for video data and audio data only, but the present invention is not limited thereto. For example, components corresponding to data broadcasting may be subjected to the upconversion processing.

In the present exemplary embodiment, upconverted components are encoded and multiplexed again and then, converted into a TS data format and stored, but the data format is not limited thereto. For example, upconverted components can be stored in a reproducible form without being encoded nor multiplexed. In this case, separation processing and decoding processing can be omitted in reproducing the data.

Further, instead of upconverting all of stored content data, the content data more suitable to user's preferences can be preferentially upconverted based on user's preference information.

Modified Example of First Exemplary Embodiment

In the first exemplary embodiment, the upconversion control unit 112 determines the upconversion processing order so as to sequentially upconvert components of content data one by one, based on component attribute information ("component type" or "tag value") of each component. According to a modified example of the first exemplary embodiment, a video component and an audio component are processed in parallel.

FIG. 8 illustrates an example of content information according to the modified example of the first exemplary embodiment. In FIG. 8, in the upconversion processing order of components of the program A, "main video data (default)" and "main audio data (default)" are first, and "sub video data 1" and "sub audio data 1" second, for example.

Further, "sub video data 2" and "sub audio data 2" are upconverted thirdly. In this case, the processing order is determined in the order of increasing "tag value" and the main data precedes the sub data. If low-priority "sub video data 2" and "sub audio data 2" are not subjected to the upconversion processing, the processing order of "sub video data 2" and "sub audio data 2" is not determined.

In the modified example of the first exemplary embodiment, the selector 301 of FIG. 2 inputs a video component and an audio component output from the decoder 103 to the high-quality image generation unit 302 and the high-quality sound generation unit 303 in parallel, respectively. Then, the image quality enhancement processing in the high-quality image generation unit 302 and the sound quality enhancement processing in the high-quality sound generation unit 303 are executed in parallel.

Second Exemplary Embodiment

According to a second exemplary embodiment of the present invention, a user can determine a processing order of components of upconversion-target content data (program). The following description is focused on different points from the first exemplary embodiment. Components similar to those in the first exemplary embodiment are denoted by the same reference numerals and thus detail description is not repeated.

Figure 9:
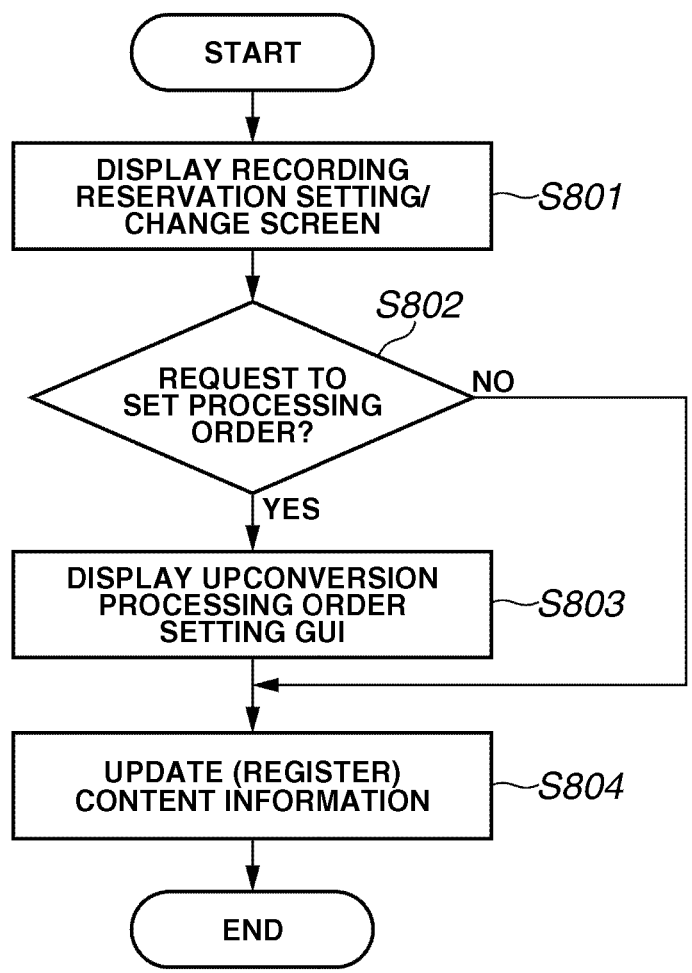
FIG. 9 is a flowchart illustrating a procedure for determining the upconversion processing order of components by a user.

FIG. 9 is a flowchart illustrating how a user sets an upconversion processing order of components. Referring to FIG. 8 and FIG. 1 used in the first exemplary embodiment, a procedure for setting the upconversion processing order in making a recording reservation of contents or in changing reserved contents is described next. Here, the main control unit 115 issues all instructions for executing a series of processes to each processing unit.

In step S801, the UI control unit 114 displays a recording reservation/changing screen on the display unit 108 in response to a user's operation from the remote controller 119.

In step S802, the main control unit 115 determines whether a user requests to set the processing order of upconversion-target components in content data (program) that is reserved to record. If the user does not enter a request (NO in step S802), the processing advances to step S804.

In step S804, the main control unit 115 makes a reservation for recording or changes settings to update content information of the content data (program) that is reserved to record. If the user newly reserves a program to record, the main control unit 115 newly registers the content information of the target content data (program).

On the other hand, if the user enters a request to set the processing order of upconversion-target components (YES in step S802), the processing advances to step S803. In step S803, the UI control unit 114 displays a GUI screen for setting the upconversion processing order (see FIG. 10). When the user sets the processing order of upconversion-target components on the displayed GUI screen, the processing advances to step S804. In step S804, the main control unit 115 updates the content information.

Figure 10:
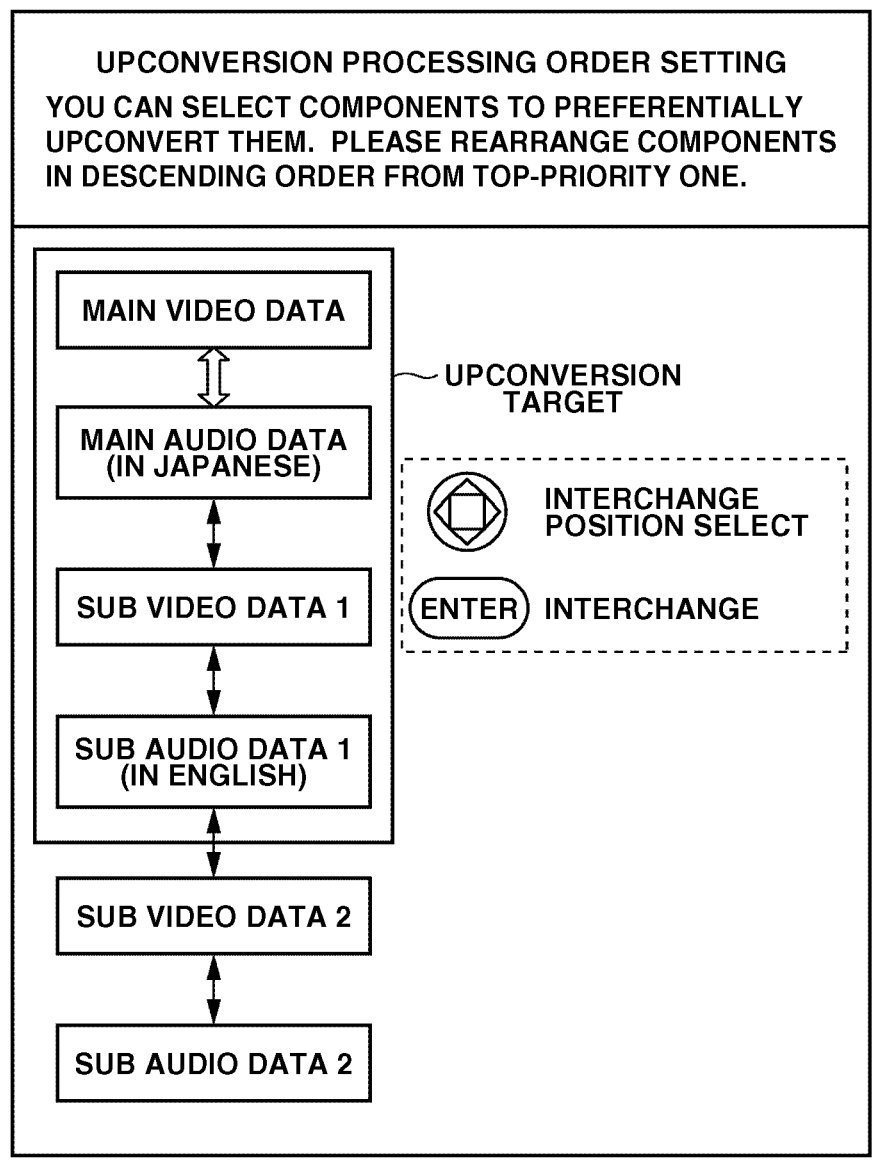
FIG. 10 illustrates an example of a graphical user interface (GUI) screen for setting the upconversion processing order.

FIG. 10 illustrates an example of the GUI screen for setting the upconversion processing order. As apparent from FIG. 10, plural upconversion-target components ("main video data", "main audio data", "sub video data 1", and "sub audio data 1") are displayed in default order from top. The default processing order is determined beforehand in a manner similar to the first exemplary embodiment, for example.

The user can change the processing order of components by operating a cursor control key of the remote controller 119 to move a focus to target components and pressing the enter key. Further, the user can upconvert components other than the upconversion-target components ("sub video data 2", "sub audio data 2", etc.) by operating the remote controller 119. Components that are beyond a display capacity of the GUI screen can be displayed along with movement of the focus.

FIG. 11 illustrates an example of the content information updated in step S804 of FIG. 9. As understood from FIG. 11, a "user setting" column indicating whether a user sets the upconversion order is set. If the user changes the processing order of upconversion-target components on the GUI screen, "0*01" is displayed in the "user setting" column; otherwise, "0*00" is displayed in the "user setting" column.

In FIG. 11, the processing order of "main video data" and "main audio data" is interchanged in "program A" and setting of the processing order of components is changed, so that "0*01" is displayed in the "user setting" column of "program A". Further, since the processing order of components of "program B" is not changed, "0*00" is displayed in the "user setting" column of "program B".

FIG. 9 illustrates an example that the GUI screen for setting the upconversion processing order is displayed if a user enters a request to set the processing order of components. However, a guide screen can be automatically displayed based on predetermined conditions. For example, as described in the first exemplary embodiment, if the upconversion processing is automatically started, the guide screen for setting the upconversion processing order is automatically displayed at the beginning of the upconversion processing.

FIG. 12 illustrates an example guide screen which is automatically displayed in the second exemplary embodiment. In FIG. 12, a GUI message indicating that the upconversion processing order can be set is displayed. The guide screen automatically disappears after the elapse of a predetermined period. If a user selects "YES" on the guide screen by operating the remote controller 119, the UI control unit 114 displays the GUI screen of FIG. 10.

If the processing order of components of upconversion-target content data (program) is already changed by a user ("0*00" is set in the "user setting" column), the guide screen can be set not to be displayed. In this case, only when the processing order of components is not yet changed by the user ("0*01" is set in the "user setting" column), the guide screen is displayed. Alternatively, the guide screen can be displayed only if upconversion-target content data (program) is not a program reserved to record by the user but automatically recorded according to preference information.

As described above, according to the second exemplary embodiment, a user can set the processing order of components of upconversion-target content data (program). As a result, desired components can be upconverted earlier, and the apparatus can perform flexible upconversion processing according to user's requests.

In the second exemplary embodiment, components are sequentially upconverted one by one, but as described in the modified example of the first exemplary embodiment, the video component and the audio component can be processed in parallel.

Third Exemplary Embodiment

A third exemplary embodiment of the present invention differs from the first exemplary embodiment in a way of determining the processing order of components of upconversion-target content data (program). The following description is focused on different points from the first exemplary embodiment. Components similar to those in the first exemplary embodiment are denoted by the same reference numerals and thus detail description is not repeated.

In the third exemplary embodiment, genre information of content data is used in executing the processing in step S504 of FIG. 5 (determination of an upconversion-target component and the upconversion processing order) described in the first exemplary embodiment. The configuration of a signal processing apparatus according to the third exemplary embodiment is identical to the first exemplary embodiment illustrated in FIG. 1 and thus is not described in detail.

However, content information stored in the memory 117 includes information about a genre of each content data (program). The memory 117 also stores genre list information referenced in determining the upconversion-target component and the upconversion processing order.

FIG. 13 illustrates an example of content information according to the third exemplary embodiment. As understood from FIG. 13, a "genre" column indicating genre information of each content data (program) is set. The genre of "program C" is set to "0*0601", and the genre of "program D" is set to "0*0000". In this example, the genre information is described in a "content_nibble_level1" descriptor and a "content_nibble_level2" descriptor of the EIT.

FIG. 14 illustrates an example of genre list information according to the third exemplary embodiment. The memory 117 stores in advance a table of genre list information which prescribes the processing order of upconversion-target components in association with each genre as illustrated in FIG. 14. For example, the processing order of components corresponding to the genre "cinema (foreign film)" is set to the order of "main video data", "main audio data (JP: Japanese)", "sub video data 1", "sub video data 2", and "sub audio data 1 (ENG: English)", and the processing order of the sixth and subsequent components is determined according to "tag value".

The upconversion control unit 112 refers to content information stored in the memory 117 to obtain genre information of the upconversion-target content data. Subsequently, the upconversion control unit 112 reads the genre list information of FIG. 14 and refers to the upconversion processing order corresponding to the genre information of the upconversion-target content data. Then, the upconversion control unit 112 sets the processing order of components and registers the order in the content information illustrated in FIG. 13.

For example, as illustrated in FIG. 13, genre "0*0601" of "program C" corresponds to "cinema (foreign film)". As illustrated in FIG. 14, the processing order of components specified to the genre "cinema (foreign film)" is set to the order of "main video data", "main audio data (JP: Japanese)", "sub video data 1", "sub video data 2", and "sub audio data 1 (ENG: English)". Therefore, as illustrated in FIG. 13, the processing order of components of "program C" is set to the order of "main video data", "main audio data (JP: Japanese)", "sub video data 1", "sub video data 2", and "sub audio data 1 (ENG: English)".

As illustrated in FIG. 14, the processing order of sixth and subsequent components is determined according to "tag value". Since "tag value: 0*12" of "sub audio data 2" of "program C" is larger than "tag value: 0*11" of "sub audio data 1" at the fifth position in the processing order, "sub audio data 2" is set to the sixth position in the processing order.

Further, genre "0*0000" of "program D" corresponds to "news". As illustrated in FIG. 14, the processing order of components specified to the genre "news" is set to the order of "main video data", "main audio data", and "sub audio data". Hence, as illustrated in FIG. 13, the processing order of components of "program D" is set to the order of "main video data", "main audio data", and "sub audio data (1)". In this case, the other components (for example, "sub video data 1", "sub video data 2" and "sub audio data 2") are not subjected to the upconversion processing.

As described above, according to the third exemplary embodiment, an upconversion-target component and the upconversion processing order are determined based on a genre of content data, so that the upconversion processing is controlled so as to be more suitable for features of contents.

Therefore, in the case of a music program that might put emphasis on a sound quality rather than an image quality, for example, the sound quality of components of "main audio data" are preferentially enhanced and a user can listen to high-quality audio content earlier. In the case of a news program that might put emphasis on an image quality rather than a sound quality, the image quality of components of "main video data" are preferentially enhanced and a user can view high-quality video content earlier.

In the third exemplary embodiment, components are sequentially upconverted one by one, but as described in the modified example of the first exemplary embodiment, the video component and the audio component can be processed in parallel.

Fourth Exemplary Embodiment

Similar to the third exemplary embodiment, a fourth exemplary embodiment of the present invention differs from the first exemplary embodiment in a way of determining the processing order of components of upconversion-target content data (program). The following description is focused on different points from the first exemplary embodiment. Components similar to those in the first exemplary embodiment are denoted by the same reference numerals and thus detail description is not repeated.

In the fourth exemplary embodiment, viewing history information of a user (past reproduction behavior) is used in executing the processing in step S504 of FIG. 5 (determination of an upconversion-target component and the upconversion processing order) described in the first exemplary embodiment.

FIG. 15 is a block diagram illustrating a configuration of a signal processing apparatus 100 according to the fourth exemplary embodiment of the present invention, in contrast to FIG. 1. A difference between FIG. 1 and FIG. 15 is that the signal processing apparatus 100 of the fourth exemplary embodiment includes a viewing history collecting unit 120.

The viewing history collecting unit 120 collects viewing history information about a program (content) selected by a user operating a remote controller 119, and stores (memorizes) the collected information in a memory 117. The viewing history collecting unit 120 also collects information about a reproduction condition of a program selected by a reservation, for example, as well as programs actually selected and viewed by a user.

FIG. 16 illustrates an example of viewing history information collected by the viewing history collecting unit 120 of FIG. 15. In FIG. 16, "service_id", "event_id", "start_time" and "event_name" are information for identifying a broadcasting station, starting time of a program, and a program name as described above with reference to FIG. 3. Further, "genre" is genre information as described above with reference to FIG. 13.

"Series_id" represents a series descriptor of the EIT which is series information for determining whether a target program is a series program (serial program broadcast plural times). Further, "viewing component" and "viewing time" represent "component type" (or "tag value") and a viewing time of a video component/audio component that a user viewed. In the present exemplary embodiment, content information of each content data includes the series information ("series_id").

As illustrated in FIG. 16, genre information ("genre") of a program "F1" is set to "0*0100", and its series information ("series_id") is set to "0*0106", for example. As apparent from FIG. 16, a user viewed components of "main video data" and "main audio data" of the program "F1" for 56 minutes, 15 seconds, viewed components of "sub video data 1" and "sub audio data 1" for 2 hours, 30 minutes, 48 seconds, and viewed components of "sub video data 2" and "sub audio data 2" for 16 minutes, 21 seconds.

FIG. 17 is a flowchart illustrating a processing procedure in the fourth exemplary embodiment. Here, steps illustrated in the flowchart of FIG. 17 are executed between steps S503 and S505 of FIG. 5 described in the first exemplary embodiment.

In step S1901, the upconversion control unit 112 reads content information of upconversion-target content data (program) from the memory 117 to obtain series information ("series_id"). Then, in step S1902, the upconversion control unit 112 refers to the viewing history information stored (memorized) in the memory 117 to determine whether a user has viewed content in the same series as the obtained series information in the past.

If the user has viewed content in the same series in the past (YES in step S1902), the processing advances to step S1903. In step S1903, the upconversion control unit 112 calculates the total viewing time of components of the content in the same series that the user viewed in the past.

On the other hand, if the user has not viewed content in the same series in the past (NO in step S1902), the processing advances to step S1904. In step S1904, the upconversion control unit 112 obtains genre information ("genre") of upconversion-target content data (program).

In step S1905, the upconversion control unit 112 refers to the viewing history information again to determine whether the user viewed a content in the same genre as the obtained genre information, in the past. If the user has viewed a content in the same genre in the past (YES in step S1905), the processing advances to step S1906. In step S1906, the upconversion control unit 112 calculates the total viewing time of components of the content in the same genre that the user viewed in the past.

On the other hand, if the user has not viewed a content in the same genre in the past (NO in step S1905), the processing advances to step S1909. In step S1909, the upconversion control unit 112 determines an upconversion target component and the upconversion processing order of components based on component attribute information ("component type" or "tag value"). Then, the processing advances to step S505.

After the upconversion control unit 112 calculates the total viewing time of components of the content in the same series or genre that the user viewed in the past in step S1903 or step S1906, the processing advances to step S1907. In step S1907, the upconversion control unit 112 selects a given number of components in the descending order of the total viewing time and determines the selected components as upconversion target components.

Next, in step S1908, the upconversion control unit 112 sets the upconversion processing order in descending order of the total viewing time. Then, the processing advances to step S505.

For example, if content data having series information ("series_id") of "0*0106" is selected as an upconversion target, the upconversion control unit 112 refers to the viewing history information of FIG. 16 to set the processing order of upconversion-target components in descending order of the total viewing time, that is, the order of "sub video data 1", "sub audio data 1", "main video data", "main audio data", "sub video data 2", and "sub audio data 2".

In this example, the video component precedes the audio component, but the audio component can precede the video component. Further, as described in the third exemplary embodiment, the processing order of the video component and audio component can be controlled according to genre, for example. As for components with no viewing history, the components can be upconverted in the order of increasing "tag value", or the processing order may be controlled according to genre.

As described above, according to the fourth exemplary embodiment, the upconversion-target component and the upconversion processing order are determined based on a viewing history of a user, so that the upconversion processing can be controlled according to user's preferences. Hence, components in the same series or genre, which are being viewed, are preferentially upconverted, so that a user can view high-quality contents earlier.

In the fourth exemplary embodiment, components are sequentially upconverted one by one, but the video component and the audio component can be processed in parallel as described in the modified example of the first exemplary embodiment.

Other Exemplary Embodiments

The processing described in the above exemplary embodiments can be realized by providing a storage medium, storing program code of software realizing the above-described functions, to a computer system or apparatus. By reading the program code stored in the storage medium with a computer (or a CPU or a microprocessor unit (MPU)) of the system or apparatus and executing them, the functions of the above-described exemplary embodiments can be realized.

In this case, the program code read from the storage medium realizes the functions according to the exemplary embodiments, and the storage medium storing the program code constitutes the present invention. The storage medium, such as a floppy disk, a hard disk, an optical disk, a magneto-optical disk and the like can be used for providing the program code. Also, compact disc read only memory (CD-ROM), compact disc readable (CD-R), a magnetic tape, a non-volatile memory card, ROM, and the like can be used.

Furthermore, the functions according to the above exemplary embodiments are realized not only by executing the program code read by the computer. The present invention also includes a case where an operating system (OS) or the like working on the computer performs part or the entire processes according to designations of the program code and realizes the functions according to the above exemplary embodiments.

Furthermore, the program code read from the storage medium can be written in a function expansion card which is inserted into the computer or in a memory provided in a function expansion unit which is connected to the computer. Thereafter, a CPU or the like contained in the function expansion card or unit can perform part or the entire processes according to designations of the program code and can realize the functions of the above exemplary embodiments. A program embodying the present invention may be provided by itself or may be carried on or by a carrier medium. The carrier medium may be a recording medium or a transmission medium. The transmission medium may be a signal, in which case a program embodying the invention may be supplied via a network such as the Internet.

As described above, one embodiment of the present invention can provide a signal processing apparatus (100) that upconverts content data including a plurality of components including at least one of a video component and an audio component, comprising: a determination unit (112) configured to perform at least one of determination processing to select an upconversion-target component from among the plurality of components based on attribute information of the content data and determination processing to determine processing order in which the components are upconverted; and a processing unit (113) configured to upconvert the components constituting the content data based on a result of the determination processed by the determination unit.

Another embodiment of the present invention can provide a signal processing apparatus (100) that upconverts content data including a plurality of components including at least one of a video component and an audio component, comprising: a setting unit (114) configured to perform at least one of setting processing to receive a user's instruction and select an upconversion-target component from among the plurality of components in response to the instruction and setting processing to set processing order in which the components are upconverted; and a processing unit (113) configured to upconvert the components constituting the content data based on the setting processed by the setting unit.

Another embodiment of the present invention can provide a signal processing apparatus (100) that upconverts content data including a plurality of components including at least one of a video component and an audio component, comprising: a storage unit (117) configured to store viewing history information regarding viewed content data; a determination unit (112) configured to perform at least one of determination processing to select an upconversion-target component from among the plurality of components based on the viewing history information stored in the storage unit and determination processing to determine processing order in which the components are upconverted; and a processing unit (113) configured to upconvert the components constituting the content data based on a result of the determination processing with the determination unit.

Another embodiment of the present invention can provide a method for upconverting content data including a plurality of components including at least one of a video component and an audio component, comprising: performing at least one of determination processing to select an upconversion-target component from among the plurality of components based on attribute information of the content data and determination processing to determine processing order in which the components are upconverted; and upconverting the components constituting the content data based on a result of the determination processing.

In one embodiment the attribute information of the content data includes information about a type of each component constituting the content data, and the method further comprises performing the determination processing based on the type of each component.

In one embodiment the attribute information about a type of each component indicates any one of a main component and a sub component, and the method further comprises performing the determination processing so as to select the main component as an upconversion-target component.

In one embodiment the attribute information about a type of each component indicates any one of a main component and a sub component, and the method further comprises performing the determination processing so as to determine the processing order to upconvert the main component prior to the sub component.

In one embodiment the attribute information of the content data includes information about a genre of the content data, and the method further comprises performing the determination processing based on the genre of the content data.

Another embodiment of the present invention can provide a method for upconverting content data including a plurality of components including at least one of a video component and an audio component, comprising: performing at least one of setting processing to receive a user's instruction and select an upconversion-target component from among the plurality of components in response to the instruction and setting processing to set processing order in which the components are upconverted; and upconverting the components constituting the content data based on the setting processing.

Another embodiment of the present invention can provide a method for upconverting content data including a plurality of components including at least one of a video component and an audio component, comprising: storing viewing history information regarding viewed content data; performing at least one of determination processing to select an upconversion-target component from among the plurality of components based on the stored viewing history information and determination processing to determine processing order in which the components are upconverted; and upconverting the components constituting the content data based on a result of the determination processing.

In one embodiment the viewing history information includes information about a component selected from the plurality of components in viewing, and the method further comprises determining the component selected from the plurality of components in viewing, as the upconversion-target component based on the viewing history information or determining the processing order so as to upconvert the component selected from the plurality of components in viewing.

In the preceding embodiments the determination/setting processing is one of (a) selecting a target component; and (b) determining the order of processing. However, any kind of planning or control of the upconversion processing could be carried out advantageously in accordance with the present invention, for example how much processing resource to allocate to each different component or how much upscaling to apply to each component.

While the present invention has been described with reference to the exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-108340 filed Apr. 17, 2007, which is hereby incorporated by reference herein in its entirety.

What is claimed is:

1. An upconversion apparatus for upconverting elementary streams of content data, the upconversion apparatus comprising:
a storage which stores a plurality of video elementary streams and/or audio elementary streams of a content data, wherein the plurality of video elementary streams and/or audio elementary streams are associated with a same event identifier;
an upconversion controller which determines a processing order in which the plurality of elementary streams are to be upconverted, based on attribute information of each elementary stream;
a separator which separates the plurality of elementary streams of the content data stored in the storage;
a decoder which decodes the separated elementary streams of the content data;
a processor which upconverts each of the decoded elementary streams of the content data in accordance with the processing order determined by the upconversion controller;
an encoder which encodes the upconverted elementary streams of the content data; and
a multiplexer which multiplexes the encoded elementary streams of the content data,
wherein image and/or sound quality of the elementary streams are improved by the upconversion, and the upconversion processing requires time longer than an actual time length of the content data, and
wherein the storage stores the encoded elementary streams of the content data.

2. The upconversion apparatus according to claim 1, wherein the attribute information of each elementary stream indicates any one of a main elementary stream and a sub elementary stream, and
the upconversion controller determines the processing order so as to upconvert the main elementary stream prior to the sub elementary stream.

3. The upconversion apparatus according to claim 1, wherein the attribute information of each elementary stream indicates an angle of a video image in a video elementary stream, and
the upconversion controller determines the processing order of the video elementary streams so that a video elementary stream corresponding to a first angle is upconverted prior to a video elementary stream corresponding to a second angle.

4. The upconversion apparatus according to claim 1, wherein the attribute information of each elementary stream includes information about a genre of the content data formed by the elementary streams, and
the upconversion controller performs the determination processing based on the genre of the content data.

5. The upconversion apparatus according to claim 1, wherein the attribute information of each elementary stream includes information about a language of each audio elementary stream, and
the upconversion controller performs the determination processing based on the language of each elementary stream.

6. The upconversion apparatus according to claim 1, further comprising:
a viewing history storage which stores viewing history information regarding viewed content data,
wherein the upconversion controller determines, based on the viewing history information of the content data, the processing order in which the plurality of elementary streams are to be upconverted.

7. The upconversion apparatus according to claim 6, wherein the viewing history information includes information about a viewed elementary stream from among a plurality of elementary streams of the viewed content data, and
the upconversion controller determines the processing order so as to upconvert an elementary stream that corresponds to a previously viewed elementary stream prior to other elementary streams.

8. The upconversion apparatus according to claim 1, wherein the content data is received broadcast program content data.

9. A method of upconverting elementary streams of content data, the method comprising:
storing a plurality of video elementary streams and/or a plurality of audio elementary streams of a content data, wherein the plurality of video elementary streams and/or audio elementary streams are associated with a same event identifier;
determining a processing order in which the plurality of elementary streams are to be upconverted, based on attribute information of each elementary stream;
separating the plurality of elementary streams of the content data;
decoding the separated elementary streams of the content data;
upconverting each of the decoded elementary streams of the content data in accordance with the determined processing order;
encoding the upconverted elementary streams of the content data;
multiplexing the encoded elementary streams of the content data; and
storing the encoded elementary streams of the content data,
wherein image and/or sound quality of the elementary streams are improved by the upconversion, and the upconversion processing requires time longer than an actual time length of the content data.

10. The method according to claim 9, wherein the attribute information of each elementary stream indicates any one of a main elementary stream and a sub elementary stream, and
the determining step comprises determining the processing order so as to upconvert the main elementary stream prior to the sub elementary stream.

11. The method according to claim 9, wherein the attribute information of each elementary stream indicates an angle of a video image in a video elementary stream, and
the determining step comprises determining the processing order of the video elementary streams so that a video elementary stream corresponding to a first angle is upconverted prior to a video elementary stream corresponding to a second angle.

12. The method according to claim 9, wherein the attribute information of each elementary stream includes information about a genre of the content data formed by the elementary streams, and the determining step includes determining the processing order based on the genre of the content data.

13. The method according to claim 9, wherein the attribute information of each elementary stream includes information about a language of each audio elementary stream, and the step includes determining the processing order based on the language of each elementary stream.

14. The method according to claim 9, further comprising:

storing viewing history information regarding elementary streams of viewed content data; and determining the processing order in which the plurality of elementary streams are upconverted based on the viewing history information.

15. The method according to claim 14, wherein the viewing history information includes information about a viewed elementary stream from among a plurality of elementary streams of the viewed content data, and the determining the processing order in which the plurality of elementary streams are upconverted based on the viewing history information comprises determining the processing order so as to upconvert an elementary stream that corresponds to a previously viewed elementary stream prior to other elementary streams.

16. The method according to claim 9, wherein the content data is received broadcast program content data.

17. A non-transitory computer-readable medium storing a computer-executable program for implementing the method according to claim 9.

* * * * *